United States Patent

Kawano et al.

[11] Patent Number: 5,132,177
[45] Date of Patent: Jul. 21, 1992

[54] ALKALINE STORAGE CELL

[75] Inventors: Katsuya Kawano, Monobe; Yoshikazu Ishikura, Uhara; Shinsuke Nakahori, Monobe, all of Japan

[73] Assignee: Sanyo Electric Co., Ltd., Moriguchi, Japan

[21] Appl. No.: 672,101

[22] Filed: Mar. 19, 1991

[30] Foreign Application Priority Data

Mar. 23, 1990 [JP] Japan .................. 2-74430

[51] Int. Cl.$^5$ .................. H01M 10/26
[52] U.S. Cl. .................. 429/206; 429/218; 429/222; 429/223; 429/229
[58] Field of Search ............ 429/206, 207, 218, 222, 429/223, 229, 57, 59; 420/83, 125, 126, 416

[56] References Cited

U.S. PATENT DOCUMENTS

4,636,445  1/1987  Yamano et al. .............. 429/206 X

Primary Examiner—Anthony Skapars
Attorney, Agent, or Firm—Morrison Law Firm

[57] ABSTRACT

A rechargeable alkaline storage cell comprising a positive electrode including an active material which mainly comprises nickel hydroxide added with zinc or a zinc compound. The cell further comprises a negative electrode and an alkaline electrolyte which mainly includes potassium hydroxide. The electrolyte also includes lithium hydroxide and sodium hydroxide.

9 Claims, 11 Drawing Sheets

ALKALINE STORAGE CELL

BACKGROUND OF THE INVENTION

1. Field of the Invention

The prevent invention relates to an alkaline storage cell including a positive electrode mainly comprising nickel hydroxide, such as a nickel-cadmium cell and a nickel-hydrogen cell.

2. Description of the Prior Art

A well-known method of preventing the nickel electrode plate of an alkaline storage cell from expanding with the progress of the charge/discharge cycle test is adding cadmium to the nickel electrode. It is also known that adding cobalt together with cadmium improves the chargeability in a high temperature and the utilization factor of the active material and also suppresses self-discharging as well as preventing the electrode plate expansion. The followings are some of the publications disclosing the above ideas, and effects thereof.

1. Japanese Patent Publication No. 42-21115: suppression of electrode plate expansion and improvement of chargeability in a high temperature 2. Japanese Patent Publication No. 60-12742: suppression of electrode plate expansion and improvement of active material utilization factor 3. Japanese Patent Publication No. 59-10538: improvement of chargeability in a high temperature and restriction of self-discharging 4. Japanese Patent Publication Laid-Open No. 48-53228: improvement of chargeability in a high temperature 5. Japanese Patent Publication Laid-Open No. 51-87733: improvement of chargeability in a high temperature 6. Japanese Patent Publication Laid-Open No. 52-114928: improvement of chargeability in a high temperature 7. Japanese Patent Publication Laid-Open No. 52-114929: improvement of chargeability in a high temperature 8. Japanese Patent Publication Laid-Open No. 62-86661: suppression of electrode plate expansion However, the use of cadmium is now more and more restricted for environmental protection. To cope with such a trend, impregnating the nickel plaque with an active material added with zinc or a zinc compound has recently been proposed (for example, Japanese Patent Publication Kokai No. 59-83347 and D. H. Fritts "Zinc Hydroxide as a Substitute for Cobalt Hydroxide in Nickel Electrodes", The Electrochemical Society Inc. 160th Meeting Extended Abstracts, Vol. 81-2, page 86 (1981)). However, simply adding zinc or a zinc compound to the active material is not enough to suppress the electrode plate expansion.

In consideration of all the above, it has been proposed to deposit the active material and zinc (or the zinc compound) together to form a solid solution (refer to Speeches for the 29th Cell Symposium, 1988, page 53). However, a cell including a nickel electrode which has the above solid solution is extremely low in chargeability, especially in a high charging temperature where oxygen overvoltage is lowered to promote the oxygen gas generation.

This problem is solved by adding a cobalt compound to the active material of the nickel electrode. Such a method can improve the chargeability of the active material but cannot suppress the electrode plate expansion sufficiently.

Another conceivable method is adding cobalt and zinc to the nickel electrode. This method requires a huge amount of cobalt in order to improve the chargeability against the adverse effect of zinc of lowering the chargeability. Accordingly, the impregnating amount of the active material is reduced, with the result of a sharp drop of the cell capacity.

SUMMARY OF THE INVENTION

Accordingly, an object of this invention is to offer an alkaline storage cell for improving the chargeability of the active material in a high temperature even if the cell comprises a positive electrode including an active material mainly comprising nickel hydroxide added with zinc or a zinc compound.

Another object of this invention is to offer an alkaline storage cell for suppressing the electrode plate from expanding.

Still another object of this invention is to offer an alkaline storage cell which has a remarkably improved charge/discharge cycle characteristic Still another object of this invention is to offer an alkaline storage cell for realizing the above objects without lowering the cell capacity.

The above objects are fulfilled by a rechargeable alkaline storage cell comprising a positive electrode including an active material mainly comprising nickel hydroxide selectively added with zinc and a zinc compound; a negative electrode; and an alkaline electrolyte mainly comprising potassium hydroxide, the electrolyte also comprising lithium hydroxide and sodium hydroxide.

The negative electrode may comprise a hydrogen-absorbing alloy.

The hydrogen-absorbing alloy may be selected from a group consisting of rare earth element hydrogen-absorbing alloy, Ti-Ni hydrogen-absorbing alloy, Ti-Mn hydrogen-absorbing alloy, Ti-Fe hydrogen-absorbing alloy, Ti-Zr hydrogen-absorbing alloy, Mg-Ni hydrogen-absorbing alloy, and Zr-Mn hydrogen-absorbing alloy.

The negative electrode may comprise cadmium.

The zinc may be added in 3 to 10 mol %.

The zinc compound may be added in 3 to 10 mol %.

The sodium hydroxide may have a density of 0.3 to 0.9 normal.

The lithium hydroxide may have a density of 1.0 to 2.0 normal.

The potassium hydroxide may have a density of at least 3 normal.

The above-mentioned objects of this invention are fulfilled by the above constructions for the following reasons.

When a nickel hydroxide electrode is charged, the following two reactions occur competitively.

$$Ni(OH)_2 + OH^- \rightarrow NiOOH + H_2O + e^- \qquad (1)$$

$$4OH^{31} \rightarrow 2H_2O + O_2 + 4e^- \qquad (2)$$

On the other hand, a nickel electrode including an active material and zinc (or a zinc compound), for example, in the form of a solid solution lowers the chargeability. The reason is: since the overvoltage of the reaction expressed by Equation (1) is heightened and the equilibrium potential is raised, the reaction expressed by Equation (2) is promoted.

The inventors of the present invention found out through various experiments that: when an electrolyte comprising an aqueous solution of potassium hydroxide added with lithium hydroxide and sodium hydroxide each in an appropriate amount is used together with a nickel electrode having a solid solution of an active material and zinc, the reaction of Equation (2) is suppressed and the reaction of Equation (1) is remarkably promoted. Although the added zinc has an adverse effect of lowering the chargeability, such effect is erased by added lithium and sodium. It has also been found out such effect of lithium and sodium cannot be obtained by using only lithium hydroxide or only sodium hydroxide. The densities of sodium hydroxide and lithium hydroxide were fixed at 0.3 to 0.9 normal and 1.0 to 2.0 normal, respectively, because too low densities are not enough to obtain the effect and too high densities decline the cell capacity.

It is attributed to the following reasons that the above effect of the present invention is realized better in a nickel-hydrogen alkaline storage cell employing a hydrogen-absorbing alloy negative electrode than in a nickel-cadmium cell.

A nickel-cadmium cell employing a cadmium electrode is sealed using by the Neumann system, by which a metallic cadmium acting as the active material generated while charging reacts on oxygen generated from the positive electrode to be cadmium hydroxide acting as the discharging active material. A nickel-hydrogen alkaline storage cell is sealed by the reaction of hydrogen as the active material and oxygen generated from the positive electrode. However, the hydrogen-absorbing alloy itself is easily oxidized by oxygen generated from the positive electrode, which drastically deteriorates the cell performance. This phenomenon is often seen where the amount of hydrogen absorbed into the alloy is small. Accordingly, when the reaction of Equation (2) has priority to the reaction of Equation (1), the oxidation of the hydrogen-absorbing alloy is easily promoted, with the result of the performance of the alloy being drastically declined. According to the present invention, however, the oxygen generation from the positive electrode is delayed. In consequence, the deterioration of the cell performance caused by the oxidation of the hydrogen-absorbing alloy is suppressed.

Since the positive electrode of the alkaline storage cell according to this invention has zinc or a zinc compound, the expansion of the positive electrode is also suppressed.

The increased chargeability of the active material, the suppressed oxidation of the hydrogen-absorbing alloy, and the suppressed expansion of the positive electrode together lead to the improved cycle characteristic.

Since only zinc or a zinc compound is added to the positive electrode, there is very little reduction in the amount of impregnating active material. Therefore, the above excellent effects are realized without reducing the cell capacity.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENT

EMBODIMENT I (Example according to the present invention)

Figure 1:
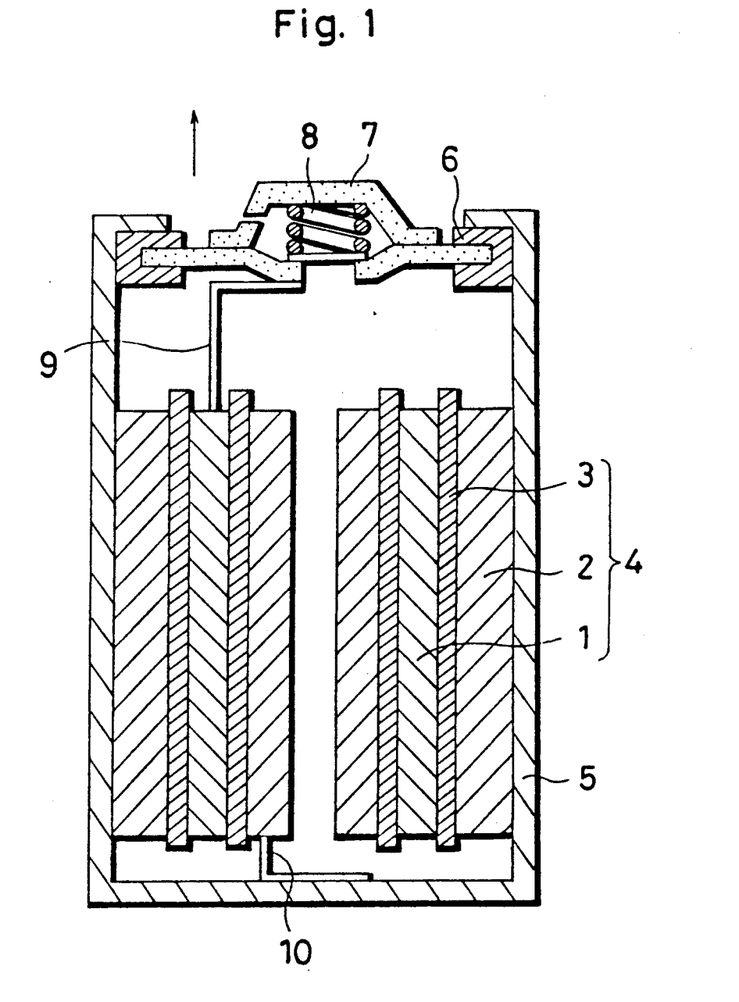
FIG. 1 is a cross sectional view of a cylindrical nickel-hydrogen alkaline storage cell as an embodiment according to this invention.

FIG. 1 is a cross sectional view of a cylindrical nickel-hydrogen alkaline storage cell as an embodiment according to this invention. The cell includes an electrode assembly 4 comprising a nickel sintered positive electrode 1, a negative electrode 2 having a hydrogen-absorbing alloy and a separator 3 interposed therebetween. The electrode assembly 4 is provided in a cell can 5 also acting as a negative terminal, the cell can 5 being connected with the negative electrode 2 through a conductive tab 10 for the negative electrode. An upper opening of the cell can 5 is covered with a sealing member 7, which is attached to the cell can 5 through a packing 6. A coiled spring 8 is disposed inside the sealing member 7. When the inner pressure of the cell gets abnormally high, the coiled spring 8 is pressed in a direction of an arrow, whereby the gas inside is blown off outside. The sealing member 7 is connected to the positive electrode 1 through a conductive tab 9 for the positive electrode.

The cylindrical nickel-hydrogen alkaline cell having the above construction was produced in the following way.

A nickel sintered plaque having a porosity of 85% was immersed in an aqueous solution of nickel nitrate added with 3 mol % of cobalt nitrate and 7 mol % of zinc nitrate, and then the nickel plaque was further impregnated with an active material mainly comprising nickel hydroxide by the chemical impregnating method, whereby producing a positive electrode. The obtained positive electrode is referred to Electrode (a).

A commercially available Mm (Misch metal: a mixture of rare earth elements), Ni, Co, Mn and Al.were mixed in an element ratio of 1:3.2:1:0.6:0.2, dissolved in a high frequency furnace, and cooled down to obtain an ingot of an alloy expressed by $MmNi_{3.2}CoMn_{0.6}Al_{0.2}$. The ingot was pulverized into powders each having a grain size of 50 μm or less. The powders were kneaded with 5 wt % of powdered PTFE (polytetrafluoroethylene) into a paste. The paste was pressure-adhered to both surfaces of a collector formed of a punched metal to produce the negative electrode 2.

Electrode (a) and the negative electrode 2 were wounded with the separator 3 therebetween to obtain the electrode assembly 4, which was encased in the cell can 5. An alkaline electrolyte comprising potassium hydroxide (KOH; density: 5 normal), lithium hydroxide (LiOH; density: 1.5 normal), and sodium hydroxide (NaOH; density: 0.6 normal) was injected into the cell can 5, and then the cell can 5 was sealed. The cylindrical nickel-hydrogen alkaline storage cell produced in this way has a theoretical capacity of 1,000 mAh, and is referred to as Cell A.

COMPARATIVE EXAMPLE 1

Cell $X_1$ was produced in the same way except that an alkaline electrolyte comprising KOH having a density of 6 normal and LiOH having a density of 1 normal was used.

COMPARATIVE EXAMPLE 2

A nickel sintered plaque having a porosity of 85% was immersed in an aqueous solution of nickel nitrate added with 10 mol % of cobalt nitrate (no zinc was added) and then the nickel plaque was further impregnated with an active material mainly comprising nickel hydroxide by the chemical impregnating method, whereby producing a positive electrode. The obtained positive electrode is referred to Electrode (x).

Cell $X_2$ was produced in the same way as Cell A but using Electrode (x).

COMPARATIVE EXAMPLE 3

Cell $X_3$ was produced in the same way as Cell A but using Electrode (x) and the electrolyte of Cell $X_1$.

EXPERIMENT 1

Figure 2:
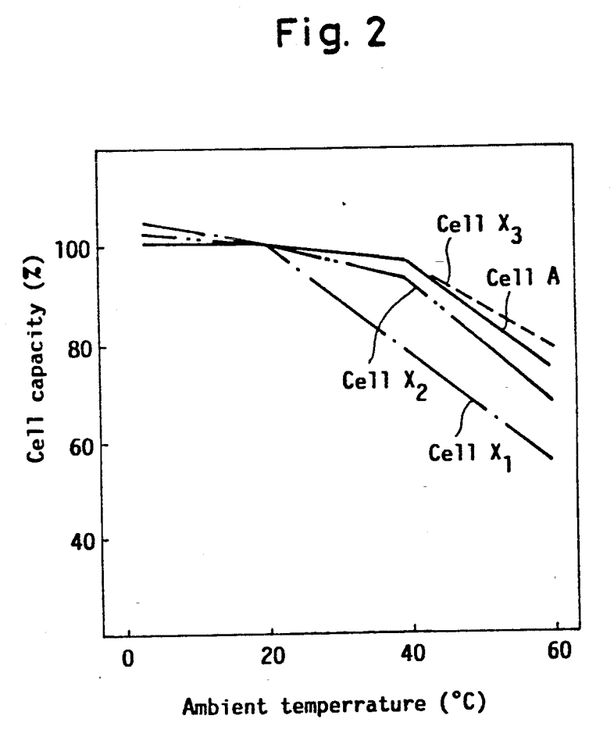
FIG. 2 is a graph showing the relationship between the ambient temperature and the cell capacity concerning Cells A according to this invention and Cells $X_1$ through $X_3$ as comparative examples.

Concerning Cells A, and $X_1$ through $X_3$, the relationship between the ambient temperature and the cell capacity was checked, the results of which are shown in FIG. 2. The cells were each charged with a current of 0.1 C for 16 hours in various ambient temperatures and then discharged with a current of 0.2 C until the cell voltage reached 1.0 V. The cell capacity (%) was calculated by setting at 100 the discharge capacity obtained when the cell was charged in an ambient temperature of 20° C.

As apparent from FIG. 2, Cell A according to this invention indicated the same tendency with Cells $X_2$ and $X_3$ having no zinc added in that the decline of the cell capacity, which would have occurred with the rise of the ambient temperature during charging, was suppressed. Cell $X_1$ indicated a sharp drop of the cell capacity with the rise of the ambient temperature. The results mean that the active material of Cell A is more easily charged than Cell $X_1$ in a high temperature.

EXPERIMENT 2

Figure 3:
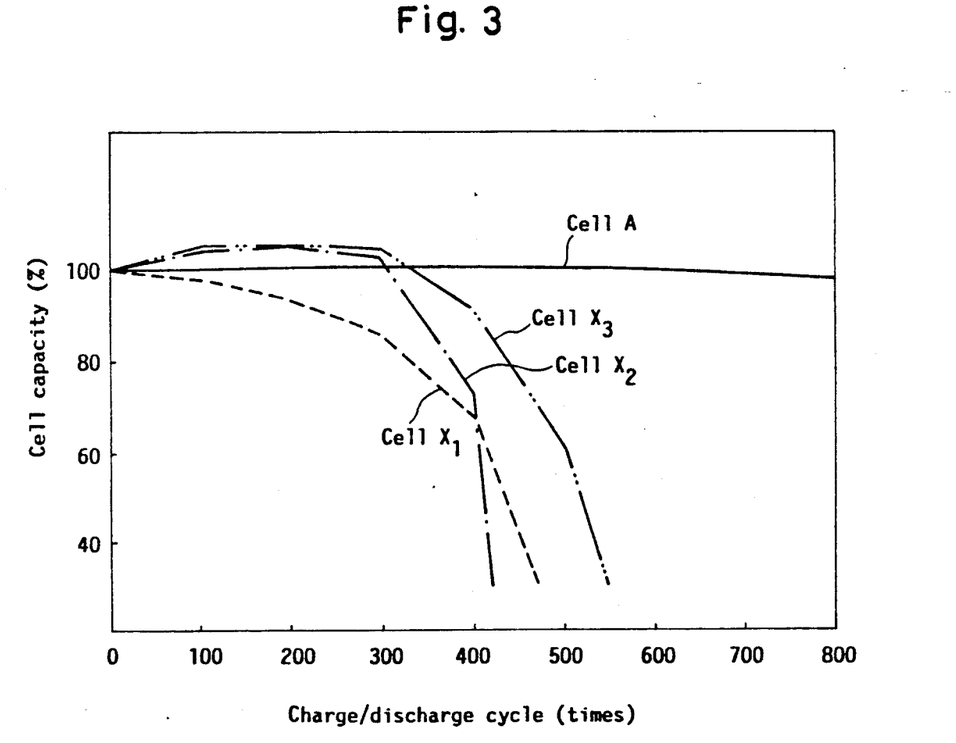
FIG. 3 is a graph showing the cycle characteristics of Cells A and $X_1$ through $X_3$.

Charge/discharge cycle characteristics of Cells A and $X_1$ through $X_3$ were checked and shown in FIG. 3. The cells were charged by a current of 1.2 C for 1 hour in the room temperature and then discharged by a current of 1 C until the cell voltage reached 1.0 V. The cell capacity (%) was calculated by setting at 100 the discharge capacity obtained after the first cycle.

As apparent from FIG. 3, Cell A according to this invention, which had a life of 800 or more cycles, had a much more excellent cycle characteristic than Cells $X_1$ through $X_3$, which each had a life of approx. 400 cycles.

SUMMARY OF EXPERIMENTS 1 AND 2

It has been confirmed through the above experiments that Cell A according to this invention is more excellent than Cells $X_1$ through $X_3$ in the cycle characteristic. Cell A is also charged almost as easily as Cells $X_2$ and $X_3$ including no zinc in a high temperature despite that Cell A employs a nickel hydrogen electrode including zinc or a zinc compound. This is attributed to the followings.

In Cell A, 1) zinc added in the positive electrode suppresses the expansion thereof, and 2) NaOH and LiOH added in the electrolyte makes the cell easy to charge (especially in a high temperature), and 3) the oxygen generation is discouraged by 2) and therefore the oxidation prevention effect of the negative electrode is taken to the fullest. In Cells $X_1$ through $X_3$, the reduction of the electrolyte in the separator causes the dryout phenomenon as will be practically described hereinafter. In Cell $X_1$, since the promotion of the oxygen gas generation provides a huge amount of oxygen in the cell, the hydrogen-absorbing alloy of the negative electrode is oxidized. In consequence, the gas consumption is lowered and the cell inner pressure is raised, resulting in the electrolyte leaking outside the cell. In Cells $X_2$ and $X_3$ including no zinc, the positive electrode is expanded, which is accompanied by the flow of the electrolyte from the separator into the positive electrode.

EXPERIMENT 3

Figure 4:
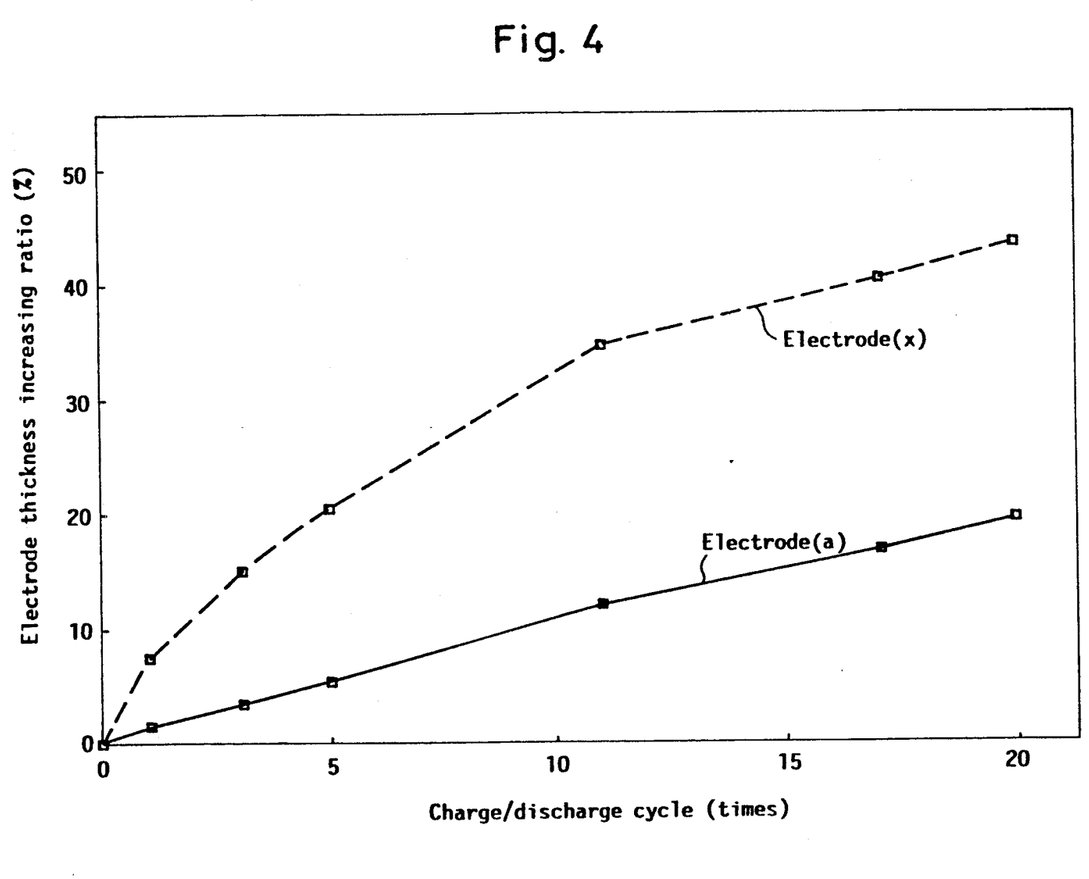
FIG. 4 is a graph showing how the thickness is increased as the charge/discharge cycle test progresses, concerning Electrodes (a) and (x)
Figure 5:
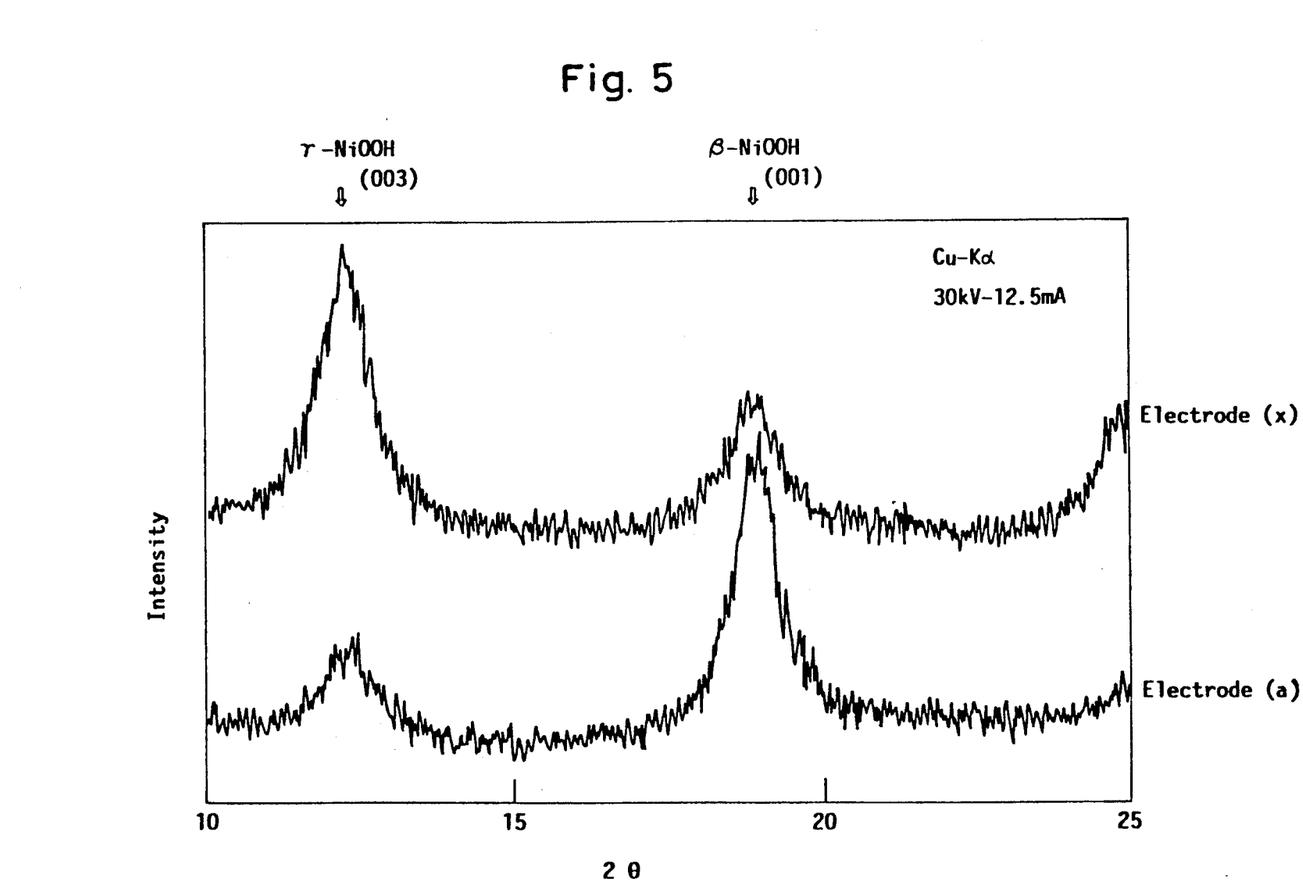
FIG. 5 is an X-ray diffraction chart of Electrodes (a) and (x)

Electrodes (a) including zinc or the zinc compound and (x) including no zinc or a zinc compound were each immersed in an ample amount of KOH having a specific gravity of 1.23, wherein the electrodes were subjected to a charge/discharge cycle test using a nickel plate as the opposite electrode to obtain the increasing ratio of the electrode thickness (FIG. 4). After the 20th cycle, an X-ray diffraction test was conducted using powders of the active material of Electrodes (a) and (x), the results of which are shown in FIG. 5. The electrodes were charged by a current of 1.5 C for 1 hour and then discharged by a current of 1 C until the electrode voltage reached 0.1 V (v.s. Hg/HgO).

As apparent from FIG. 4, Electrode (a) indicated a much lower thickness increasing ratio than Electrode (x). This phenomenon is attributed to that the generation of γ-NiOOH, which is a low-density active material, is more suppressed in Electrode (a) than in Electrode (x) as apparent from FIG. 5.

EXPERIMENT 4

Positive electrodes were produced in the same way as Electrode (a) but with various amounts of zinc: 0, 3, 5, 7 and 10 mol %. The thickness increasing ratio of each of these positive electrodes was checked after the third cycle in the same way as in Experiment 3, the results of which are shown in FIG. 6.

Figure 6:
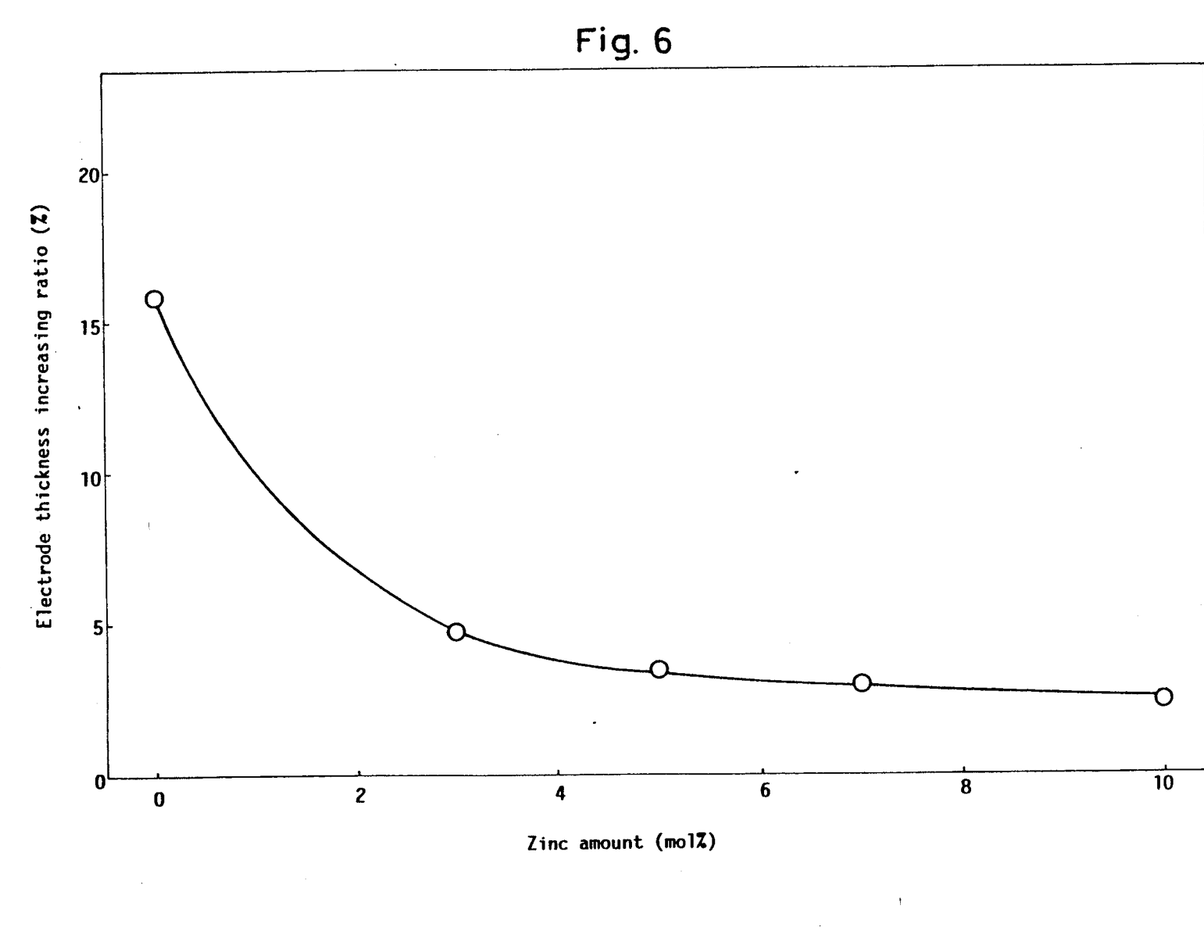
FIG. 6 is a graph showing the relationship between the amount of zinc and the increasing ratio of the electrode thickness.

As apparent from FIG. 6, the thickness increasing ratio was extremely low when zinc was included in 3 mol % or more. The desirable amount of zinc is 3 to 10 mol % since the electrode capacity is lowered when zinc is included in more than 10 mol %.

EXPERIMENT 5

Figure 7:
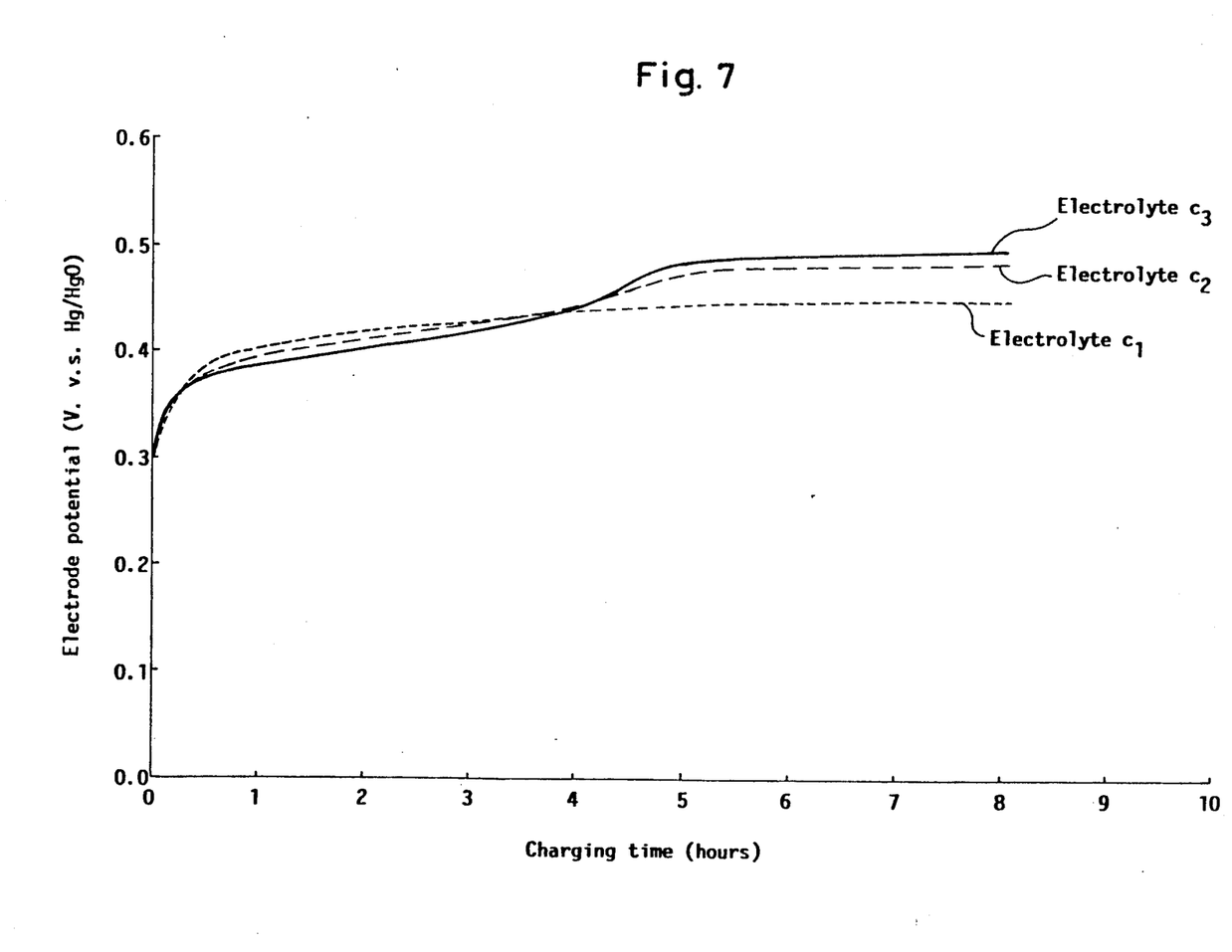
FIG. 7 is a graph showing the relationship between the charging time and the electrode potential obtained by using Electrolyte $c_1$ through $c_3$.

How effectively NaOH and LiOH increases the electrode potential was checked using Electrode (a), the results of which are shown in FIG. 7. The electrode was charged by a current of 0.2 C for 8 hours. The following three electrolytes were used in ample amounts.

Electrolyte $c_1$: KOH (7N)
Electrolyte $c_2$: KOH (6N)+LiOH (1.5N)
Electrolyte $c_3$: KOH (5N)+LiOH (1.5N)+NaOH (0.6N)

As apparent from FIG. 7, Electrode $c_1$ made only a small difference between the initial potential and the potential after the electrode was fully charged ($O_2$ generated). This means the reactions expressed by Equations (1) and (2) were occurring competitively. Electrolyte $c_2$ including LiOH made a bigger, Electrolyte $c_3$ including LiOH and NaOH made a still bigger potential difference, which means charging was promoted by the addition of LiOH and more promoted by the further addition of NaOH.

EXPERIMENT 6

Figure 8:
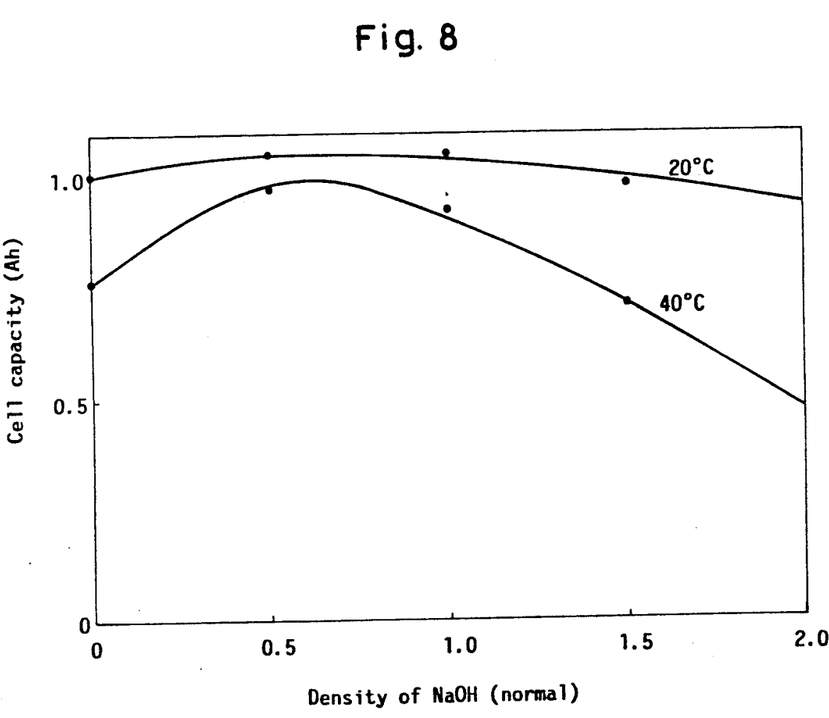
FIG. 8 is a graph showing the density of NaOH in the electrolyte and the cell capacity.

FIG. 8 shows the relationship among the cell capacity, the density of NaOH and the charging temperature. The cells used for the experiment were of the same type as Cell A. The densities of KOH and LiOH were fixed at 6 normal and 1.5 normal, respectively. The cells were each charged by a current of 0.1 C for 16 hours in ambient temperatures of 20° C. and 40° C. and then discharged by a current of 0.2 C until the cell voltage reached 1.0 V in the room temperature.

The results in FIG. 8 indicates that the desirable density of NaOH is 0.3 to 0.9 normal, which gets more evident as the charging temperature rises.

EXPERIMENT 7

Figure 9:
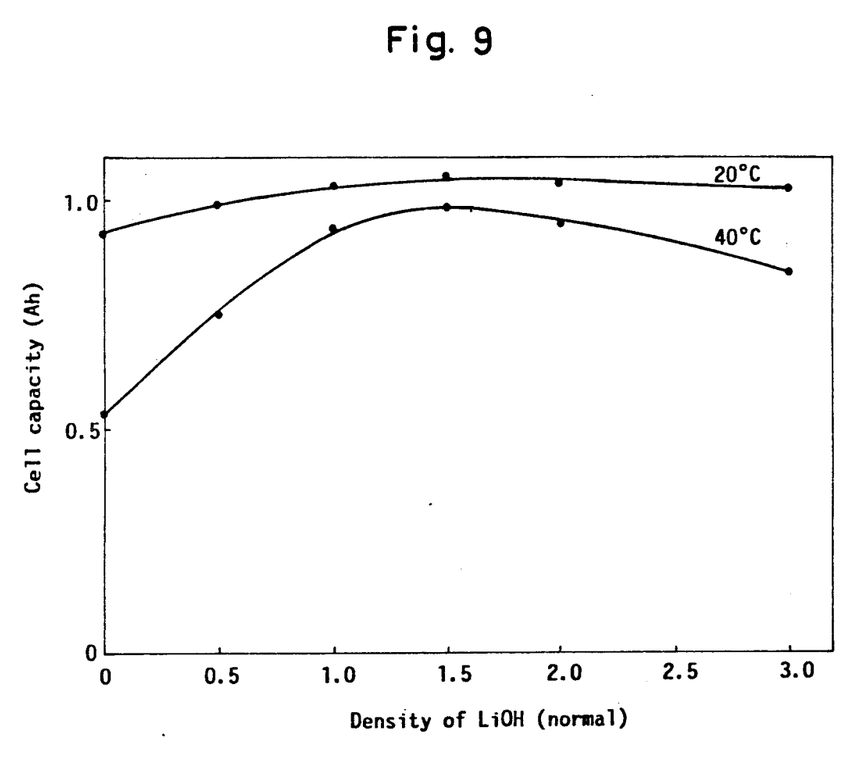
FIG. 9 is a graph showing the density of LiOH in the electrolyte and the cell capacity.

FIG. 9 shows the relationship among the cell capacity, the density of LiOH and the charging temperature. The cells used for the experiment were of the same type as Cell A. The densities of KOH and NaOH were fixed at 6 normal and 0.6 normal, respectively. The experiment conditions were the same as in Experiment 6.

The results in FIG. 9 indicates that the desirable density of LiOH is 1.0 to 2.0 normal, which gets more evident as the charging temperature rises.

EXPERIMENT 8

Figure 10:
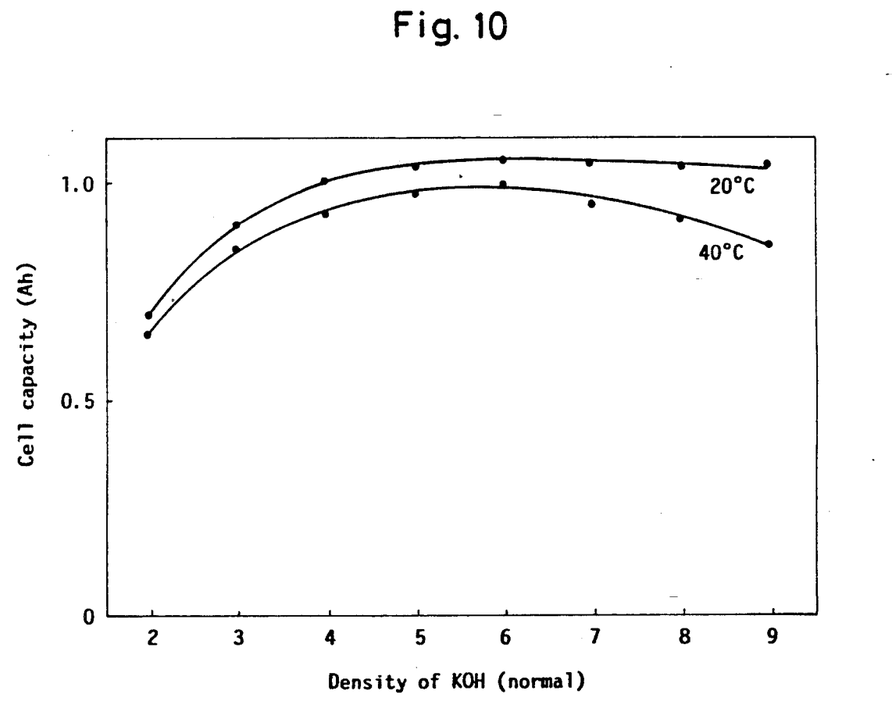
FIG. 10 is a graph showing the density of KOH in the electrolyte and the cell capacity.

FIG. 10 shows the relationship among the cell capacity, the density of KOH and the charging temperature. The cells used for the experiment were of the same type as Cell A. The densities of LiOH and NaOH were fixed at 1.5 normal and 0.6 normal, respectively. The experiment conditions were the same as in Experiment 6.

The results in FIG. 10 indicates that the desirable density of KOH is 3 normal or more.

SUMMARY OF EXPERIMENTS 6 THROUGH 8

In an alkaline storage cell having a positive electrode comprising an active material mainly comprising nickel hydroxide added with zinc or a zinc compound, the following densities are desirable for the electrolyte.
KOH: 3 normal or more
LiOH: 1.0 to 2.0 normal
NaOH: 0.3 to 0.9 normal

EMBODIMENT II

Example according to the subject invention

Cell B was produced in the same way as Cell A except that a negative electrode including a hydrogen-absorbing alloy expressed by $Ti_{0.5}Zr_{0.5}Ni_{1.5}V_{0.5}$ was used.

COMPARATIVE EXAMPLE

Cell Y was produced in the same way as Cell B except that an alkaline electrolyte comprising KOH having a density of 6 normal and LiOH having a density of 1.5 normal was employed.

EXPERIMENT

Figure 11:
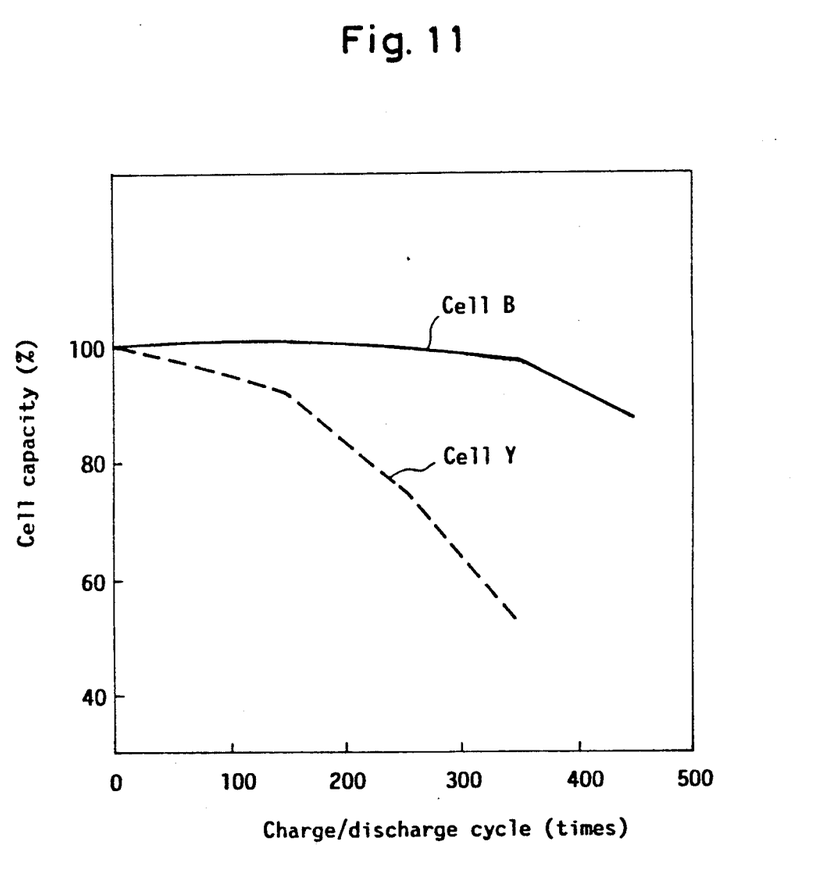
FIG. 11 is a graph showing the cycle characteristics of Cells B according to the present invention and Cell Y as a comparative example.

FIG. 11 shows the charge/discharge cycle characteristics of Cells B and Y. The experiment conditions were the same as in Experiment 1 of Embodiment I.

As apparent from FIG. 11, Cell B indicated a much longer life than Cell Y. Other points to note 1. It has been confirmed through experiments that the same effects can be obtained with a cadmium negative electrode as those obtained with the hydrogen-absorbing alloy negative electrode.
2. Instead of the hydrogen-absorbing alloy expressed by $MmNi_{3.2}CoAl_{0.2}Mn_{0.6}$, other types of hydrogen-absorbing alloys including the followings can also be used: rare earth element such as $LaNi_2Co_3$, Ti-Ni, Ti-Mn, Ti-Fe, Ti-Zr, Mg-Ni and Zr-Mn.

Although the present invention has been fully described by way of embodiments with references to the accompanying drawings, it is to be noted that various changes and modifications will be apparent to those skilled in the art. Therefore, unless such changes and modifications depart from the scope of the present invention, they should be construed as being included therein.

What is claimed is:

1. A rechargeable alkaline storage cell comprising:
    a positive electrode including an active material mainly comprising nickel hydroxide selectively added with zinc and a zinc compound;
    a negative electrode; and
    an alkaline electrolyte mainly comprising potassium hydroxide, said electrolyte also comprising lithium hydroxide and sodium hydroxide.
2. A cell of claim 1, wherein said negative electrode comprises a hydrogen-absorbing alloy.
3. A cell of claim 2, wherein the hydrogen-absorbing alloy is selected from a group consisting of rare earth element hydrogen-absorbing alloy, Ti-Ni hydrogen-absorbing alloy, Ti-Mn hydrogen-absorbing alloy, Ti-Fe hydrogen-absorbing alloy, Ti-Zr hydrogen-absorbing alloy, Mg-Ni hydrogen-absorbing alloy, and Zr-Mn hydrogen-absorbing alloy.
4. A cell of claim 1, wherein said negative electrode comprises cadmium.
5. A cell of claim 1, wherein the zinc is added in 3 to 10 mol %.
6. A cell of claim 1, wherein the zinc compound is added in 3 to 10 mol %.
7. A cell of claim 1, wherein the sodium hydroxide has a density of 0.3 to 0.9 normal.
8. A cell of claim 1, wherein the lithium hydroxide has a density of 1.0 to 2.0 normal.
9. A cell of claim 1, wherein the potassium hydroxide has a density of at least 3 normal.

* * * * *